Figure 1:
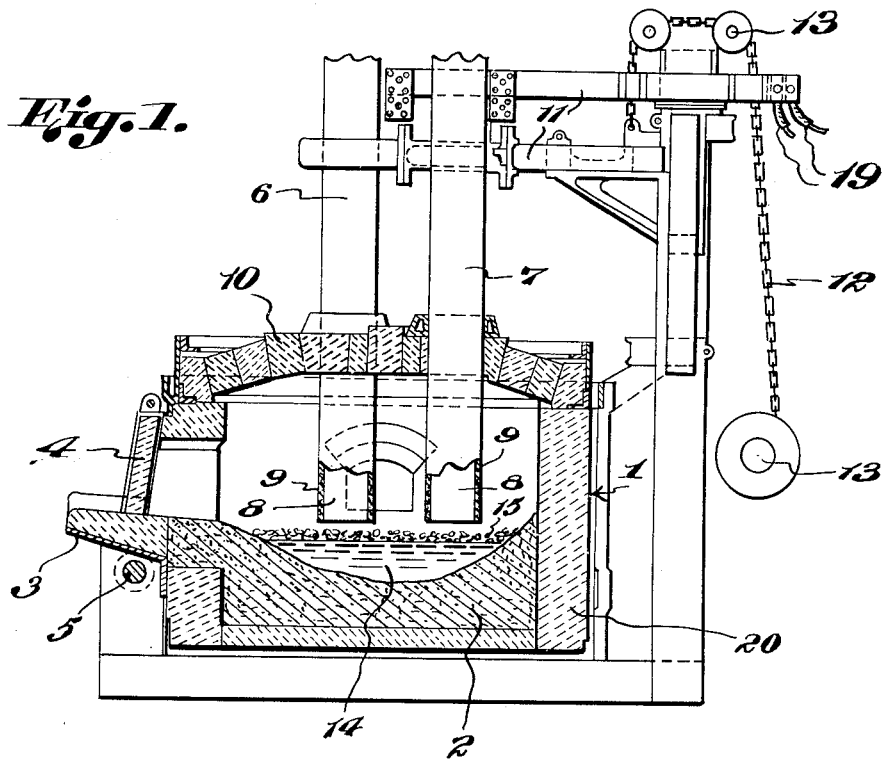

Nov. 18, 1941.  J. H. DEPPELER  2,262,887

MANUFACTURE OF FERROUS METALS

Filed June 6, 1939

INVENTOR,
J. H. Deppeler
BY Henry C. Parker
ATTORNEY

Patented Nov. 18, 1941

2,262,887

UNITED STATES PATENT OFFICE 2,262,887

MANUFACTURE OF FERROUS METALS

John Howard Deppeler, Weehawken, N. J., assignor to Metal & Thermit Corporation, New York, N. Y., a corporation of New Jersey Application June 6, 1939, Serial No. 277,688

4 Claims. (Cl. 75—12)

This invention relates to manufacture of ferrous metals; and it comprises a process of producing various ferrous metals, such as alloy steels, by the use of the heat of the electric arc, wherein an incompletely refined iron or steel electrode bearing a slag-forming coating is melted down in a heat-insulated furnace by forming and maintaining an arc between the said electrode and another conductor, which may be another similar electrode, for example, the composition of said coating being such as to produce refining of the metal of said electrode, the coating usually also containing alloying ingredients as well as fluxing ingredients, deoxidizers, reducing agents, etc.; all as more fully hereinafter set forth and as claimed.

While the manufacture of the cheaper grades of steel in large scale operations has been fairly well standardized with the Bessemer and the open-hearth processes forming the bulk of the production and the electric furnace process being used to a relatively small extent in certain localities favored by cheap electric power, the manufacture of the higher grades of steel and of ferrous alloys is not nearly so well standardized, especially in the establishments which manufacture such products only on a small scale. The electric furnace is especially adapted to the manufacture of these latter products since its flexibility of operation lends itself to the production of either low- or high-carbon steel as well as to the production of all types of ferrous alloys. A special advantage is that operations in the electric furnace can be conducted with the substantial exclusion of air. For these reasons the use of the electric furnace has been expanding rapidly. But the production of ferrous metals by the use of the electric furnace offers many technological difficulties.

In the manufacture of tool steel or other high grade products the charge of the electric furnace is usually made up of select cold stock. But in the making of cheaper products the charge used is much the same as that employed in the open hearth processes, that is, pig iron, steel scrap, lime and iron ore, the pig iron being either cold stock or molten. A large proportion of the production is accomplished by means of "duplexing" operations in which the electric furnace is operated in conjunction with either a Bessemer or open hearth conversion, the semi-finished steel from one of these processes being transferred to the electric furnace.

There is but little uniformity in the operation of the electric furnace by different users. Owing to the different prices and analyses of the various ingredients of the charge in different localities and to the divergent opinions of various melters, many different practices have resulted. The component parts of the charge are seldom added at one time. Deoxidizers and alloying elements are added in different quantities and at different times during the heat. Easily oxidized alloying elements are usually added either at the end of the heat or to the ladle. Some additions cannot be made through the slag even towards the end of the heat. Some are made after the removal of one slag and before the addition of a clean slag. More or less carbon is uncontrollably added to the melt from the carbon or graphite electrodes which are used in the usual arc furnaces. Oxidizable elements are lost in the slag and the composition of the final molten heat depends on the length of time the entire operation takes. These are some of the factors which contribute to cause the diversity of procedure in different manufacturing plants. It is obvious that only by the use of carefully selected materials for the charge, and the services of highly skilled furnace operators, metallurgists and chemists, is it possible to even approach uniformity of results. Most of the smaller foundries are unable to afford this expense and there has therefore long been a demand in the art for simpler and more fool-proof methods of producing uniform, high-grade ferrous metals and alloys by electric furnace methods. The present invention is believed to supply a solution for this problem.

I have found that the variable factors and the disadvantages mentioned above can be eliminated by a method which makes the smallest electric furnace operators as capable as the largest to produce uniform ferrous metals of the highest grade. This is accomplished by replacing the usual carbon or graphite electrodes, which are employed for heating the conventional arc furnace, by means of metal electrodes which not only supply the required heat but which also, upon melting, furnish the molten charge and the slag in a highly reproducible manner. The slag is derived from a heavy slag-forming coating which fuses as the electrode is consumed. This coating usually also contains fluxing, reducing and alloying constituents which perform their usual function in the production of ferrous alloys. The metal used as a core in these electrodes may vary considerably in composition from one electrode to another provided that the slag-forming coating is simultaneously altered in composition in such manner as to counterbalance any changes in composition of the metal core. But since the metal cores of these electrodes can be made on a large scale and in the larger steel mills, it is possible to make these cores of highly uniform composition. It is also possible, of course, to produce highly uniform slags since the metal cores can be coated with a high degree of reproducibility. The electrodes of my invention are fed by the same automatic means which are now employed for feeding the carbon or graphite electrodes. The current consumed can be controlled readily by known methods. With all these variables under accurate control my method is capable of producing heats which are much more uniform than those produced by prior methods even with charges of substantially the same composition. In fact high grade steels and alloys can be produced with a degree of uniformity hitherto impossible of attainment. It is thus seen that in my method the technical services and skill required to produce uniform results are incorporated in the metal electrodes themselves and therefore can be purchased at a given price per pound. The smallest furnace operators can actually produce better products than the larger operators not making use of this method.

It is evident, of course, that my method is capable of wide adaptability and is highly flexible. If desired the metal cores of my electrodes may have substantially the composition which is desired in the finished product. In this case the coating on the electrodes is composed principally of fluxes and slag-forming ingredients with usually a small quantity of reducing agents to prevent the oxidation of any easily oxidized components which may be present. On the other hand the metal core may be of an impure iron or steel and the coating may contain the usual iron ore and other slag-forming ingredients which are added in the open hearth process to produce the slag of the acid or of the basic process. In this case the metal of the electrode is refined during the fusion of the electrode. It is generally preferred, however, to employ as a core metal semi-finished steel, that is a partly refined steel produced either by the Bessemer or by the open hearth process. Cores of semi-finished steel can be produced at low cost in the larger manufacturing establishments and these cores are capable of producing somewhat more uniform results in my method than is obtained when the electric furnace is employed to produce complete refining. When semi-finished steel is used for the cores of my electrodes it is evident that a form of duplexing is involved, the cost of which is but slightly higher than the duplexing operations which are now widely used and in which the steel is finished in the electric furnace. The cost of fabricating the metal cores for my electrodes is low, in fact molds for making the cores can be used in place of the usual ingot molds, while the cost of coating the electrodes is little if any greater than the expense involved in the usual methods of forming slags in electric furnaces. And, needless to say, the slag coatings can be produced with a degree of uniformity which is far greater than the uniformity obtained by the usual methods of adding the slag-forming ingredients to the furnace.

My invention can be explained in greater detail by reference to the following examples in which specific compositions are given for the metal cores and slag-forming coatings of several electrodes within my invention and which have been found to produce valuable ferrous metals.

EXAMPLE 1.—*Carbon-molybdenum—.50*

In making the well-known alloy, carbon-molybdenum—.50, a steel core containing 0.13 to 0.18 per cent carbon and 0.4 to 0.6 per cent manganese is employed. A slag-forming coating having the following composition is suitable:

| | Per cent |
|---|---|
| Feldspar | 36.5 |
| Ferro-manganese (85 per cent manganese) | 18 |
| Hematite | 36.5 |
| Silica | 4.5 |
| Ferro-molybdenum (60 per cent molybdenum) | 4.5 |

This coating is produced by mixing the above ingredients together in finely divided form and adding sufficient silicate of soda solution to serve as binder. The resulting paste is then applied to the electrode core by any suitable method. The composition of the alloy produced by the above described electrode is approximately as follows:

| | Per cent |
|---|---|
| C | 0.10 to 0.12 |
| Mn | 0.40 to 0.60 |
| Mo | 0.50 to 0.60 |
| S and P | Less than 0.03 |

EXAMPLE 2.—*3½ per cent nickel-steel*

In making steel containing 3½ per cent of nickel an electrode having a steel core analyzing 0.13 to 0.18 per cent carbon and 0.4 to 0.6 per cent manganese is employed. A slag-forming coating having the following composition is suitable:

| | Per cent |
|---|---|
| Feldspar | 35 |
| Chalk | 8 |
| Ferro-manganese (85 per cent manganese) | 15 |
| Hematite | 35 |
| Ferro-molybdenum (60 per cent molybdenum) | 2.5 |
| Nickel | 1 |
| Silica | 3.5 |

This composition is made into a paste with silicate of soda solution and applied to the steel core.

EXAMPLE 3.—*Stainless steel*

In making a stainless steel having a composition of 18 per cent chromium and 8 per cent nickel, a core wire of this same composition is employed. A slag-forming coating of the following composition is suitable:

| | Per cent |
|---|---|
| Fluorspar | 35 |
| Marble dust | 50 |
| Ferro-manganese (85 per cent manganese) | 9 |
| Ferro-chromium | 3 |

The powdered ingredients are made into a paste with silicate of soda solution and applied to the core.

While it might seem that there would be but little demand for electrodes, such as those of Example 3, in which the heat produced has a composition which is substantially identical to that of the metal core employed, this is far from true. The use of our method ensures the presence of a slag on the surface of the molten metal which protects the metal from oxidation and chemical change. Reproducible results can be obtained. And there is no more convenient way of producing such a heat, which is available to the small melters and users of such products.

While the slag-forming coating of Example 3 is designed to maintain the chemical composition of the melt substantially identical to that of the core wire, the composition of this coating can be changed readily in order to produce metals of different composition. Thus, by increasing the percentage of ferro-chromium in the coating the melt will contain higher percentages of chromium. It is also possible to add nickel to the slag coating provided that it is desired to have this metal present in the melt.

My invention can be explained further by reference to the accompanying drawing which shows, more or less diagrammatically, three different types of electric furnaces which can be employed in my process. In this showing, Fig. 1 is a vertical section of the so-called Heroult electric furnace, the electrodes illustrated being partly broken away to show their structure, Fig. 2 is a diagrammatic showing of the structure of the Girod furnace in vertical section, while Fig. 3 is a diagrammatic showing of the structure of the Stassano furnace in vertical section.

In the various figures like parts are designated by like reference numerals. In Fig. 1 the Heroult furnace shown is of the usual construction, having a steel shell 1, lined with insulating brick 20, and a basic hearth 2. A pouring lip 3 is provided and the usual pouring gate is shown at 4. This furnace is of the tiltable type, the pivot for tilting being shown at 5. Two of my new electrodes are shown at 6 and 7, these electrodes being formed with a metal core 8 and an outer slag-forming coating 9. These electrodes are suspended vertically through the roof 10 of the furnace by the usual arrangement of clamps 11, chains 12 and pulleys 13, the lower pulley being driven by an automatically operated motor, not shown, which serves to control the height of the electrodes above the heat in the usual manner. The molten metal is indicated at 14 and the slag at 15. The current connections are shown at 19.

Figure 2:
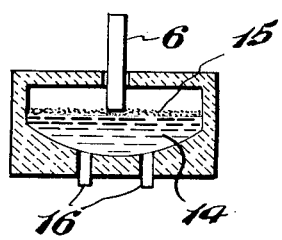
Figure 3:
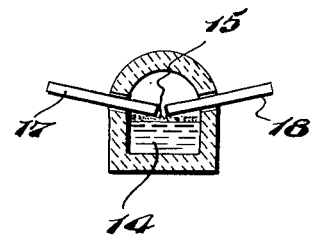

In Fig. 2, the Girod furnace shown is provided with a single upper electrode 6, made in accordance with this invention, and two bottom electrodes 16, the latter being of the usual water-cooled steel type. In Fig. 3, the Stassano furnace shown is provided with two electrodes 17 and 18 which are disposed at a slight angle to the horizontal, both being electrodes of the present invention. It is also evident, of course, that the furnace employed in connection with my process can be of the so-called Keller type or of the Greaves-Etchells type. In the latter a carbonized hearth lining is used which becomes the conductor, while in the Keller furnace a steel grid is employed which projects upwardly through the hearth lining.

The electrodes used in this invention can be operated on either direct or alternating current. The heat is derived mainly from the arcs but a small amount is generated by resistance heating as the current passes through the bath. The size of the electrodes may be varied widely but I have found it convenient to employ electrodes having diameters corresponding substantially to the diameters of the carbon or graphite electrodes conventionally used in the present arc furnaces. If this is done the carbon or graphite electrodes may be merely replaced by the metal core electrodes of the present invention. The metal cores are, of course, somewhat smaller than the electrodes as a whole owing to the slag-forming coating. When the metal core is 5 inches in diameter, for example, the coating employed may vary from about ⅛ inch to 1½ inches or more in thickness, depending upon the composition of the core, the composition desired in the finished metal, etc.

The coatings may be applied to my electrodes by making the coating compositions into the form of pastes with the necessary binding agent, such as water glass, and then applying these compositions to the metal cores by extrusion or other coating methods. It is frequently desirable to protect the coatings by means of a fabric tape wound around the outside of the coating. This tape may be made of cellulosic material in which case it becomes carbonized during the process.

The energy consumed in my process is usually not in excess of that consumed in the usual electric furnacing operations. A 15-ton Heroult furnace, for example, equipped with electrodes having a core diameter of 4 inches, can be operated with a current of about 90,000 amperes at 30 volts, that is, on 2700 kilowatts. With the electrodes of larger diameter 5000 kilowatts may be required. But since it usually requires only from 3 to 5 minutes to produce a heat by my method, the kilowatt-hour consumption remains low. When extensive refining operations are conducted in my process or when it is desired to retain a heat in the furnace in molten condition for any length of time, it may become necessary or desirable to provide auxiliary heating means. This means may take the form of induction coils adapted to produce induction heating or of auxiliary carbon or graphite electrodes to produce arc heating. It is also possible in my process to remove the ends of the metal electrodes from the furnace and to insert carbon or graphite electrodes towards the finish of a heat. The furnace may also be fired with fuel to supply auxiliary heat.

My process is very simple to operate. In order to start the process, with the furnace cold, it is only necessary to strike the arc in the furnace in some manner, for example, by contacting the electrodes with a strip of metal placed on the hearth of the furnace. As soon as the arc is struck the metal core rapidly melts down and the slag-forming coating likewise melts and flows on top of the molten metal. The metal usually melts somewhat more readily than the coating and hence the arc is partially protected from contact with the air by a tubular portion of the coating which extends beyond the metal.

The procedures followed, after the electrodes are melted and after the metal baths obtained in my process have reacted with the slags, are conventional. For example, the furnace may be tapped into the usual ladle and then poured into the usual ingot molds. Any of the procedures used in handling the heats obtained from the open hearth and the usual electric furnaces can be employed.

While I have described what I consider to be the best embodiments of my invention, it is evident that many modifications can be made in the specific procedures described without departing from the purview of this invention. As stated previously, the compositions of both the metal cores and of the slag-forming coatings can be varied widely in order to adapt my process for particular purposes. It is sometimes advantageous to employ electrodes with hollow metal cores filled with a slag-forming composition. The materials introduced in the center of the electrodes are somewhat less subject to oxidation and the slag composition at this point is, of course, protected from injury and abrasion. If desired, ferrous metal tubes may be employed as electrodes with all the slag-forming composition inside. Alloying metals may be added in the form of finely-divided metals or as metal oxides or other compounds. In case metal compounds are used as alloying constituents it is necessary to incorporate reducing agents in the coating adapted to reduce the compounds to the corresponding metals. It is possible to produce slags having a composition which varies during the heat by changing the composition of the coating on the electrode along its length. For example, it is advantageous to incorporate deoxidizing agents, such as carbon, silicon and titanium, in the coating towards the upper end of the electrodes in order that deoxidizing conditions may be obtained shortly before the heat is tapped from the furnace. It is also advisable to incorporate manganese and other easily oxidized alloying materials in the upper ends of the coatings. My method is particularly adapted to the production of high carbon steel from low carbon steel electrodes, and to the production of such ferrous alloys as 2 to 3 per cent nickel steel, carbon-molybdenum .50, chrome-molybdenum, copper bearing steel, and in fact any alloy steel. Other modifications of my process which fall within the scope of the following claims will be immediately evident to those skilled in this art.

What I claim is:

1. In the foundry practice of making heats of steels covered with slags, from semi-finished undeoxidized steels containing more carbon than that desired in the final steel and derived directly from steel-making processes of the Bessemer and open-hearth type, the process which comprises producing from such a semi-finished steel a solid core of an arc-furnace electrode having a diameter of the order of 4 to 5 inches, coating said core with a thick slag-forming coating containing metal oxides adapted to reduce the carbon content of said steel when said core is melted down by the heat of an electric arc, passing the so-constructed electrode into a heat-insulated arc furnace, striking and maintaining an arc between said electrode and another conductor in said furnace, thereby producing fusion of said steel core, feeding said electrode into the furnace as it is consumed while supplying sufficient current to maintain the body of the resulting steel melt fluid, and reacting said metal with the metal-refining constituents of said slag, thereby producing a finished steel heat containing less carbon than said steel core.

2. In the foundry practice of making heats of alloy steels covered with slags, from semi-finished undeoxidized steels containing more carbon than that desired in the final steel and derived directly from steel-making processes of the Bessemer and open-hearth type, the process which comprises producing from such a semi-finished steel a solid core of an arc-furnace electrode of substantial size, coating said core with a thick slag-forming coating containing metal oxides adapted to reduce the carbon content of said steel when said core is melted down by the heat of an electric arc and also containing alloying constituents adapted to alloy with the molten steel, striking and maintaining an arc between the so-constructed electrode and another conductor in said furnace, thereby producing fusion of said steel core, feeding said electrode into the furnace as it is consumed while supplying sufficient current to maintain the body of the resulting steel melt fluid, and reacting said metal with the metal-refining and alloying constituents of said slag, thereby producing a refined alloy steel heat containing less carbon than said steel core.

3. An electrode, adapted to be melted down by the heat of an electric arc in a heat-insulated electric arc furnace to produce a molten heat of finished steel covered with a slag, which comprises a solid core of semi-finished undeoxidized steel containing more carbon than that desired in the finished steel and being derived directly from a steel-making process of the Bessemer and open-hearth type, said core having a diameter of the order of 4 to 5 inches and being surrounded by a heavy coating of a slag-forming composition containing iron oxide and other constituents in amount sufficient to reduce the carbon content of the steel core when melted down in the heat of an electric arc.

4. An electrode, adapted to be melted down by the heat of an electric arc in a heat-insulated electric arc furnace to produce a molten heat of finished alloy steel covered with a slag, which comprises a solid core of semi-finished undeoxidized steel containing more carbon than that desired in the finished steel and being derived directly from a steel making process of the Bessemer and open-hearth type, said steel core having a diameter of the order of 4 to 5 inches and being surrounded by a heavy coating of a slag-forming composition containing iron oxide and alloying constituents adapted to reduce the carbon content of said semi-finished steel and to alloy with said steel when melted down by an electric arc.

JOHN HOWARD DEPPELER.